US010094400B2

(12) United States Patent
 Tamiozzo

(10) Patent No.: US 10,094,400 B2
(45) Date of Patent: Oct. 9, 2018

(54) CONNECTION ARRANGEMENT OF TWO BODIES WITH A REMOVABLE CLAMP

(71) Applicant: METAL WORK S.p.A., Concesio (BS) (IT)

(72) Inventor: Corrado Tamiozzo, Brescia (IT)

(73) Assignee: METAL WORK S.P.A., Concesio (BS) (IT)

( * ) Notice: Subject to any disclaimer, the term of this patent is extended or adjusted under 35 U.S.C. 154(b) by 368 days.

(21) Appl. No.: 14/896,946

(22) PCT Filed: Jul. 14, 2014

(86) PCT No.: PCT/IB2014/063087
 § 371 (c)(1),
 (2) Date: Dec. 9, 2015

(87) PCT Pub. No.: WO2015/011601
 PCT Pub. Date: Jan. 29, 2015

(65) Prior Publication Data
 US 2016/0146234 A1    May 26, 2016

(30) Foreign Application Priority Data

Jul. 26, 2013  (IT) .............................. MI2013A1256

(51) Int. Cl.
 *F16B 2/12* (2006.01)
 *F16B 5/00* (2006.01)
(52) U.S. Cl.
 CPC .............. *F16B 2/12* (2013.01); *F16B 5/0072* (2013.01)
(58) Field of Classification Search
 CPC ......... Y10T 403/5766; Y10T 403/5781; F16B 2/02; F16B 2/065; F16B 5/0072; F16B 5/0635
 See application file for complete search history.

(56) References Cited

U.S. PATENT DOCUMENTS 2,384,198 A * 9/1945 Sheldon ................ F16B 5/0072
 52/461
2,962,133 A * 11/1960 Kivett ................... F16B 5/0072
 411/437

(Continued)

FOREIGN PATENT DOCUMENTS

CN       201771904 U      3/2011
DE       1 025 493    *   3/1958   ............ F16B 5/0072

(Continued)

OTHER PUBLICATIONS

Chinese Office Action for Corresponding Chinese Application No. 201480041667.4 (9 Pages) (dated Aug. 26, 2016).

(Continued)

*Primary Examiner* — Michael P Ferguson
(74) *Attorney, Agent, or Firm* — Lucas & Mercanti, LLP

(57) ABSTRACT

A connection arrangement having at least two bodies of components to be connected to each other and a constraining group for constraining two bodies to each other in a removable manner is disclosed. When the two bodies are in the connection configuration to each other, a recess of one of them defines with a corresponding recess of the other one a respective coupling seat with the constraining group, having at least one pair of locking clamps insertable into a respective coupling seat. When the two bodies are in the connection configuration to each other, they are spaced from each other so that their faces do not have portions in mutual contact with each other.

10 Claims, 10 Drawing Sheets

(56) References Cited

U.S. PATENT DOCUMENTS

| | | | | |
|---|---|---|---|---|
| 3,390,901 A | * | 7/1968 | Bibb | H01P 1/042 285/406 |
| 4,082,324 A | * | 4/1978 | Obrecht | F15B 13/0814 137/271 |
| 4,318,637 A | * | 3/1982 | Oger | E21D 11/24 405/153 |
| 5,123,770 A | | 6/1992 | Trenner | |
| 9,771,960 B2 | * | 9/2017 | Tamiozzo | F16B 2/12 |

FOREIGN PATENT DOCUMENTS

| | | | |
|---|---|---|---|
| DE | 19951452 A1 | 4/2001 | |
| EP | 0 471 889 * | 2/1992 | F16B 7/04 |
| FR | 1164375 A | 10/1958 | |
| FR | 2584115 A1 | 1/1987 | |
| FR | 2828914 A1 | 2/2003 | |
| NL | 7313621 A | 4/1974 | |
| WO | 2013080172 A1 | 6/2013 | |

OTHER PUBLICATIONS

International Search Report and Written Opinion based on International Application No. PCT/IB2014/063087, dated Nov. 13, 2014 (10 pages).

* cited by examiner

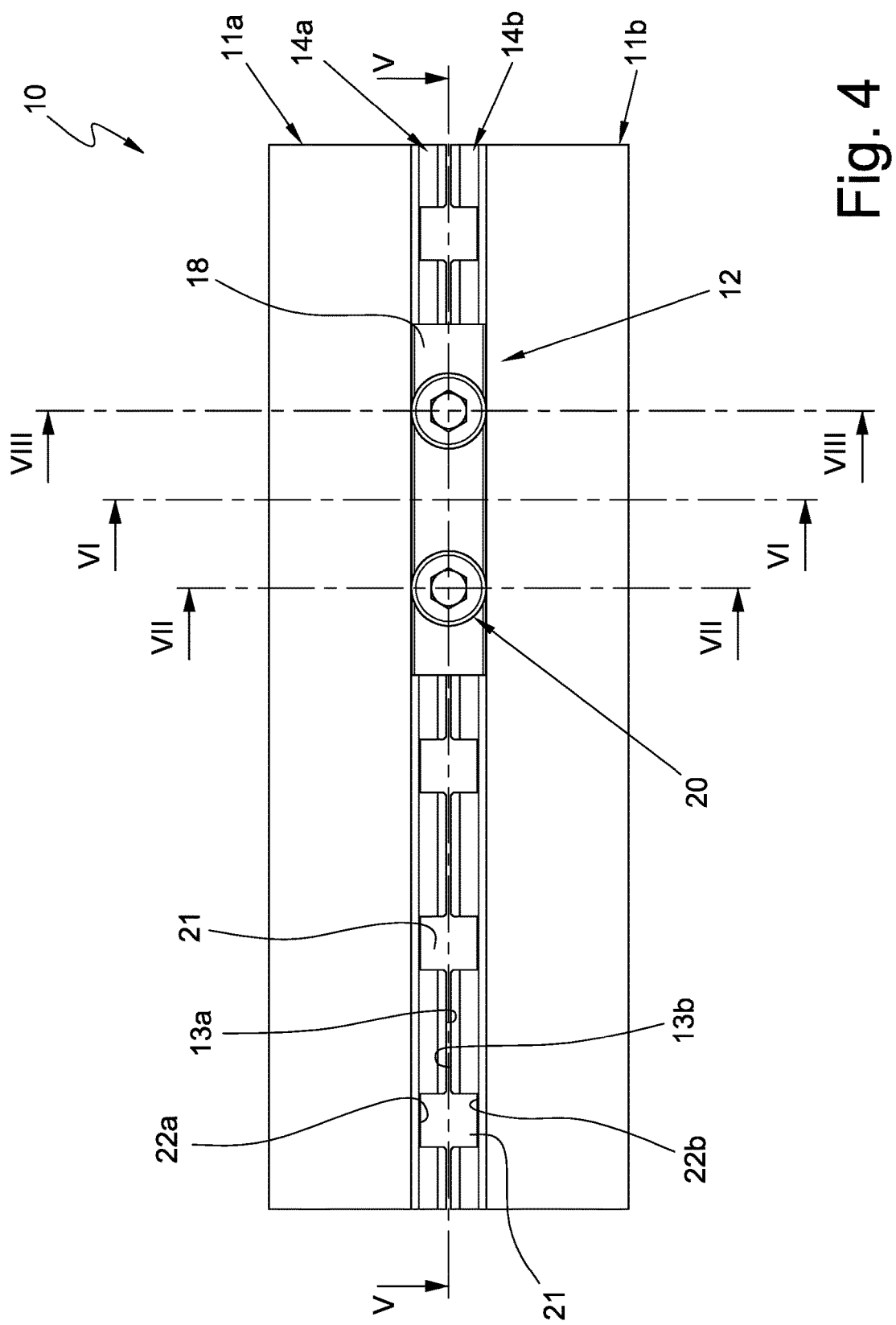

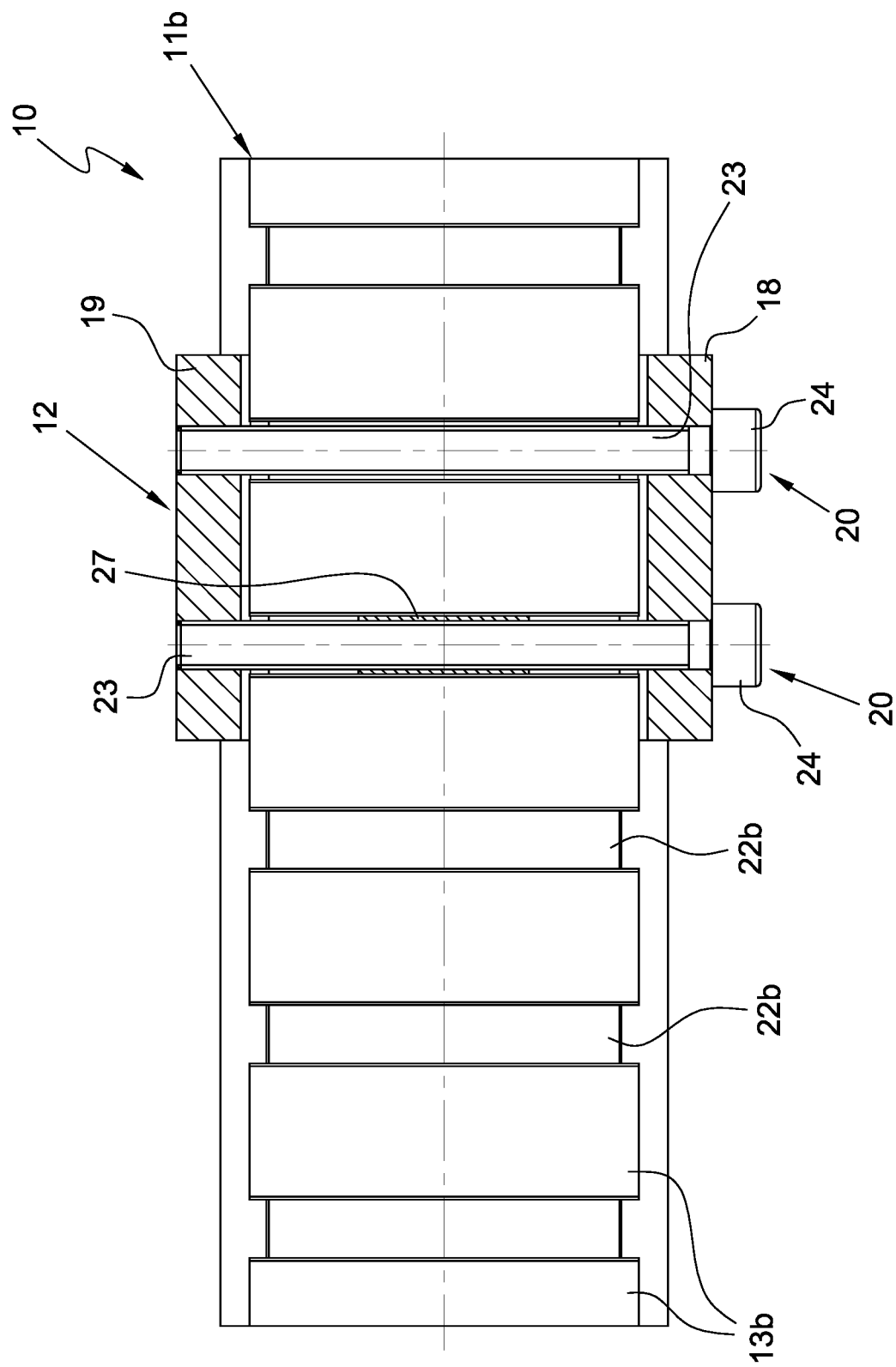

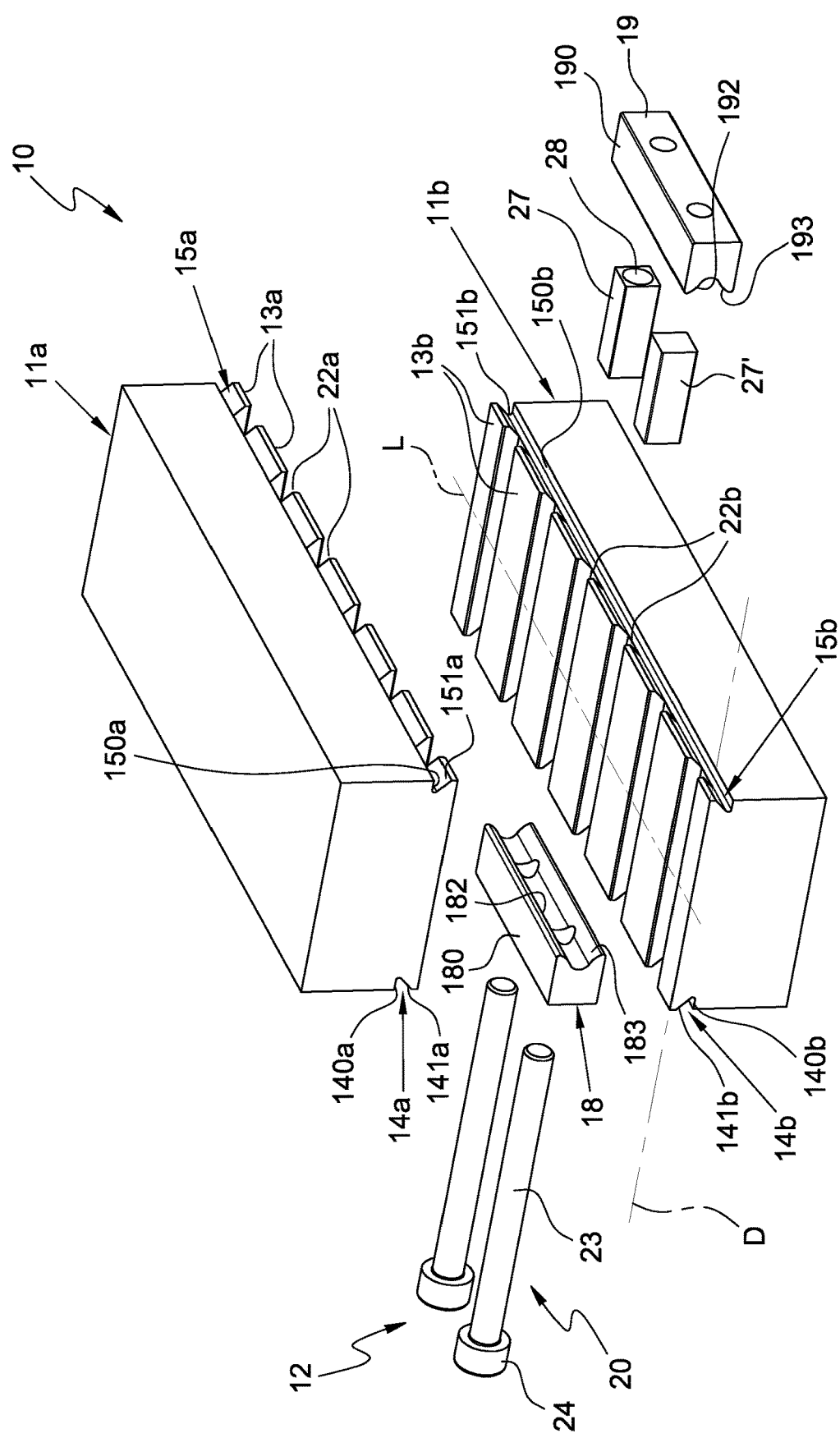

CONNECTION ARRANGEMENT OF TWO BODIES WITH A REMOVABLE CLAMP

CROSS-REFERENCE TO RELATED APPLICATIONS

This application is a 371 of PCT/IB2014/063087, filed Jul. 14, 2014, which claims the benefit of Italian Patent Application No. MI2013A001256, filed Jul. 26, 2013.

FIELD OF THE INVENTION

The present invention refers to a connection arrangement of at least two bodies of components of a movement mechanical automation group with a removable constraining group.

BACKGROUND OF THE INVENTION

For the purposes of the present description, by movement mechanical automation group we mean to indicate a group of components for transmitting, transforming and driving linear or rotary movements, which components are connected to one another and are combined so as to be able to actuate a predefined series of movements, except for the components of the power circuit that supplies such a group.

Such components comprise, in particular, pneumatic, hydraulic or electric actuators, slides, clamps, profiles, guide profiles or the like.

Mechanical automation groups of such a kind are used, in particular, in machine tools that are intended for moving, processing or assembling pieces.

Let us consider, for example, manipulator arms or so-called "pick-and-place" systems that automatically pick up a piece from a first location, move the piece thus taken towards a second location where they release it, possibly having first modified its spatial orientation.

In such mechanical automation groups the translation elementary movements along the three Cartesian axes, of rotation with respect to such axes themselves and the movements of taking and releasing the single pieces are actuated by respective linear and rotary actuators and by clamps that are combined with one another and are connected so as to achieve the desired series of movements.

According to the machine tools and to the relative movement mechanical automation group to be obtained, it is necessary, in terms of design, to select the type of actuators and/or clamps to be used in function of the foreseen loads, of the strokes of the single movements to be carried out and of the spaces available, and mechanically connect them to one another.

In the case in which it is desired to make a "pick-and-place" system, purely as an example, it is possible to provide a clamp that is mounted on a rotary actuator and is suitable for carrying out a rotation of 90° width about a horizontal axis, wherein the rotary actuator is, in turn, mounted on a slide that is driven by a linear actuator that is arranged with a vertical axis and is in turn fixed on a slide driven by a linear actuator that is arranged with a horizontal axis. Such an arrangement allows, for example, picking-up a piece from a first location, rotating it and moving it vertically and horizontally towards a second location where it is to be released.

The various components of such a movement mechanical automation group must be connected to one another in the designed sequence.

Conventionally, such a connection is of the removable type and it provides for the use of plates, brackets, L-shaped elements and support blocks, each of which has a series of threaded holes in which threaded members engage that block the single components on them.

The design and the manufacturing of every single connection arrangement that is "customised" as a function of the machine tool and of the mechanical automation group to be made are particularly burdensome both in terms of time, and in terms of costs and limit the possibilities of modifications and variants.

In order to avoid such a drawback, different connection systems have been developed that are in some way "unified" or "standardized" which allow connecting the various components in different possible configurations.

A first known connection system provides for the use of so-called "adaptors", which consist of one or more plates that have different shapes and that are interposed between two components to be connected, and of removable fixing members for fixing the plates to one another and to each of two components to be connected.

As a function of the type of components to be connected and as a function of the different possibilities of connecting them, however, it is necessary to have a wide range of different "adaptors".

This, consequently, involves a complication and a series of burdens, in terms of time and costs, for the design, manufacturing, provision and management at the store of the different types of "adapters".

Moreover, regardless of how wide the range of foreseen "adaptors" may be, the connection types that can be made are in any case limited and do not satisfy all possible situations.

A second known connection system provides for making on each component, in particular on each actuator, a plurality of holes that may or may not be threaded and a plurality of precision holes, wherein the first ones are provided for coupling with or the passage of the connection threaded members and the second ones are provided for coupling with the reference pins. The arrangement, the number and the dimensions of the threaded and non-threaded holes and of the precision ones are copied identically on a plurality of types of components (actuators).

Such a known connection system allows connecting two components, even of different types, directly to one another, without requiring to interpose adaptors, of any kind, between them. This consequently has the advantage of limiting the bulk of the overall connection arrangement and the advantage of ensuring greater connection rigidity between the various components.

However, such a connection system of the known type also has some application limitations.

For different technical reasons, indeed, the arrangement, the number and the dimensions of the threaded and non-threaded holes and of the precision holes are not identically copied on all the possible types of components, so that only components of types having threaded and non-threaded holes and precision holes in a number, arrangement and dimensions that are compatible with one another can be connected to one another.

A third known connection system provides for making on at least one face of each component a portion that in cross-section has a dove-tail shape. Two components of such a type are connected to one another at the respective dove-tail portions through a pair of locking clamps that are joined to one another by one or more threaded stems and that lock such two portions arranged facing and opposite one another.

Each of the two clamps has an "insert"-type central portion that is interposed between the two dove-tail portions acting as a spacer of the two components to be connected. In the space created between the two components to be connected, that have thus been spaced apart, the threaded stems that join the two clamps are arranged.

A connection system of such a type is described for example in U.S. Pat. No. 5,123,770 to Montech AG.

A connection system of such a type has the advantage of being particularly simple and of allowing connecting different types of components, as long as they are each provided with at least one dove-tail portion, as the system needs to be provided with a limited number of "adaptors", that is locking clamps.

Moreover, such a connection system allows, during assembly, to adjust the position of the two components relatively to one another along the longitudinal axis of the dove-tail portions that extends orthogonally with respect to the axis along which the threaded stems that join the two clamps extend.

However, even such a known connection system has some drawbacks.

A first drawback is represented by the fact that the two components that are connected to one another are spaced from one another by a distance that is greater than the diameter of the threaded stems and that is equal to the thickness of the "inserts" arranged between them, which, on one hand, increases the bulk of the overall connection arrangement and, on the other hand, reduces the connection rigidity.

A second drawback consists of the fact that the possibility of sliding along the longitudinal axis of the dove-tail portions, in conditions of use, can generate undesired movements of the two components relatively to one another, movements which are caused, for example, by vibrations or overloading.

Moreover, in such a connection system any reference of the position of the two components relatively to one another along the longitudinal axis of the dove-tail portions lacks. In case of maintenance or replacements interventions, which require the disassembly and the re-assembly of the two components, a particular experience is required by the operators in charge for finding the original and correct position of the components themselves relatively to each other with the use of measuring tools and wasting time.

In order to avoid such a last drawback a connection system has been proposed as described in DE-19951452-A1 to Montech AG.

In the connection system described in DE-19951452-A1 the use of a plurality of reference pins is provided for each reference pin having an end that is inserted in a seat that is obtained in one of the two clamps and the opposite end that is inserted in a seat that is obtained in the respective component or piece to be connected.

Such a solution, however, is structurally complex and requires machining both the fixing clamps, as well as both the components or pieces to be connected for making a corresponding plurality of seats for inserting the reference pins in them.

Such a solution, moreover, suffers from the same drawbacks indicated above with reference to U.S. Pat. No. 5,123,770 in terms of the bulk and the rigidity of the connection arrangement considered as a whole.

The drawbacks indicated above are solved by the object of the patent application IT2011MI002202 (WO2013080172), in which the two bodies to be connected have a surface for mutual resting one on the other and a coupling profile that is defined at at least two opposite perimeter portions of the respective mutual resting surface and that is engageable by a constraining group.

The coupling profile, in practice, consists of an inclined flank of a dove-tail portion.

The constraining group comprises at least one pair of locking clamps that can be engaged with the coupling profiles and that can be connected to one another in a removable manner by at least one connection member, of the threaded stem type, which is housed with clearance in a corresponding seat that is defined by at least one groove that is obtained in at least one of the two bodies and that passes between the respective two opposite perimeter portions.

Each of two clamps has a "V"-shaped profile that engages with the inclined flanks of the dove-tail portions of the two bodies lying over one another.

In such a way, in the assembly configuration, the two bodies are locked to one another and on top of one another with the respective mutual resting surfaces in close contact one on the other. This makes it possible, furthermore, to reduce the bulk of the group of the two bodies connected to one another.

Moreover, thanks also to the use of tongues that are housed in the same grooves and that are possibly crossed by stems for connecting the clamps, the solution object of patent application IT2011MI002202 (WO2013080172) allows to increase the connection precision rigidity and stability of the two bodies in the longitudinal direction, i.e. along the direction that is parallel to the mutual resting surfaces and orthogonal to the axis of the connection stems.

Although this last known type of solution is efficient, it can still be improved.

As mentioned above, indeed, the solution object of the patent application IT2011MI002202 (WO2013080172) allows to connect the two bodies by aligning them in a precise, reliable and repeatable manner along the longitudinal direction of the bodies themselves.

The alignment of the two bodies in the transversal direction, i.e. along the direction that is substantially parallel to the axes of the connection stems of the two locking clamps, is, for some applications, insufficiently precise.

The alignment of the two bodies in the transversal direction, indeed, is performed trough the approaching and locking movement of the two clamps on the two bodies placed one on the other with the respective mutual resting surfaces in contact with one another.

During the approaching and locking step, indeed, the two clamps are engaged on the coupling profiles of the two bodies (the inclined flanks of the corresponding dove-tail portions) and, if the latter are misaligned with one another in the transversal direction, they make them slide on one another along such a transversal direction, tending to make them become aligned.

In such a case, however, the friction between the mutual resting surfaces of the two bodies is opposed to the sliding necessary in order to realign the bodies themselves. The clamps, moreover, can be subjected to inclinations on the plane that is orthogonal with respect to the mutual resting surfaces of the two bodies and that is parallel to the axes of the connection stems, as a consequence of which they tend to block and to wedge or stop in such a position, jeopardizing the further sliding of the two bodies along the transversal direction that would be necessary in order to achieve the complete transversal alignment of the latter.

This situation is schematically shown, in an exaggerated manner purely so as to be understood more clearly, in FIGS.

11A, 11B and 11C with reference to the solution object of the patent application 1T2011MI002202 (WO2013080172).

Such figures show two bodies 200a and 200b that are placed one on the other with the respective mutual resting surfaces 201a, 201b in mutual contact at least except for misalignments DT along the transversal direction.

At the opposite sides of each of the two mutual resting surfaces 201a, 201b a corresponding coupling profile 202a, 203a and 202b, 203b is defined, consisting of the inclined flank of a dove-tail portion.

The coupling profiles 202a, 202b and 203a, 203b of the two bodies 200a, 200b arranged one on the other, engages with the "V"-shaped profile 204, 205 of a pair of clamps 206, 207 that are locked to one another by at least one threaded stem (only schematically shown by the respective axis S) housed in grooves that are obtained in the bodies 200a, 200b themselves and that are not represented in such FIGS. 11A-11C.

FIG. 11A shows the two bodies 200a, 200b one on the other with the respective mutual resting surfaces 201a, 201b in contact with one another except for a misalignment DT in the transversal direction in an initial approaching step of the two clamps 206 and 207 by the relative stem S.

FIG. 11B shows a subsequent step, in which, following the locking of the stem S, due to the transversal misalignment DT, the two clamps 206 and 207 rest with their respective "V"-shaped profile 204, 205 each on only one of the coupling surfaces 202a, 202b and 203a, 203b of the two bodies 200a, 200b: the clamp 206 engages with the coupling profile 202b of the body 200b, the clamp 207 engages with the coupling profile 203a of the body 200a.

Continuing with the approaching and locking of the two clamps 206, 207, these tend to rotate on the plane that is orthogonal to the mutual resting surfaces 201a, 201b and parallel to the axis S of the stem, in order to bring their "V"-shaped profile into contact with both the corresponding coupling profiles 202a, 202b and 203a, 203b of the two bodies.

As a consequence of such a rotation, the two clamps 206, 207 tend to "adapt" to this arrangement and/or to wedge or stop, so that, although the two bodies 200a, 200b, are locked to one another, they no longer exert on such same bodies 200a, 200b a thrusting action that tends to make them slide along the transversal direction so as to nullify the misalignment DT thereof.

Once the locking has occurred, therefore, between the two bodies 200a, 200b there is still a residual transversal misalignment DT' in the order of about 0.5 mm.

It should be noted that such a situation has been represented in an exaggerated manner in FIG. 11C purely to clarify the description thereof.

In most applications, such an error of transversal misalignment can be tolerated; however, in some applications it is necessary to have greater precision in the transversal alignment between the two bodies.

SUMMARY OF THE INVENTION

The purpose of the present invention is that of avoiding the drawbacks of the prior art.

In such a general purpose, one particular purpose of the present invention is that of proposing a connection arrangement of at least two bodies, in particular at least two bodies of a movement mechanical automation group with a removable constraining group, that is compact and has minimal bulk and that allows to obtain high alignment precision of the two bodies both in the longitudinal direction and in the transversal direction.

Yet a further purpose of the present invention is that of proposing a connection arrangement of at least two bodies of components of a movement mechanical automation group, with a removable constraining group, that is structurally and constructively simple and that is cost-effective.

These purposes according to the present invention are achieved by making a connection arrangement of at least two bodies of components of a movement mechanical automation group, with a removable constraining group, as outlined in claim 1.

Further characteristics are provided in the dependent claims.

BRIEF DESCRIPTION OF THE DRAWINGS

The features and the advantages of a connection arrangement of at least two bodies of components of a movement mechanical automation group, with a removable constraining group, according to the present invention shall become clearer by the following description, given as an example and not for limiting purposes, with reference to the attached schematic drawings, in which:

FIG. 4 is a side view of FIG. 1;

FIG. 5 is a section view according to the plane V-V of FIG. 4;

FIG. 9 is an axonometric and an exploded view of an alternative embodiment of the connection arrangement according to the present invention;

DETAILED DESCRIPTION OF THE INVENTION

Figure 1:
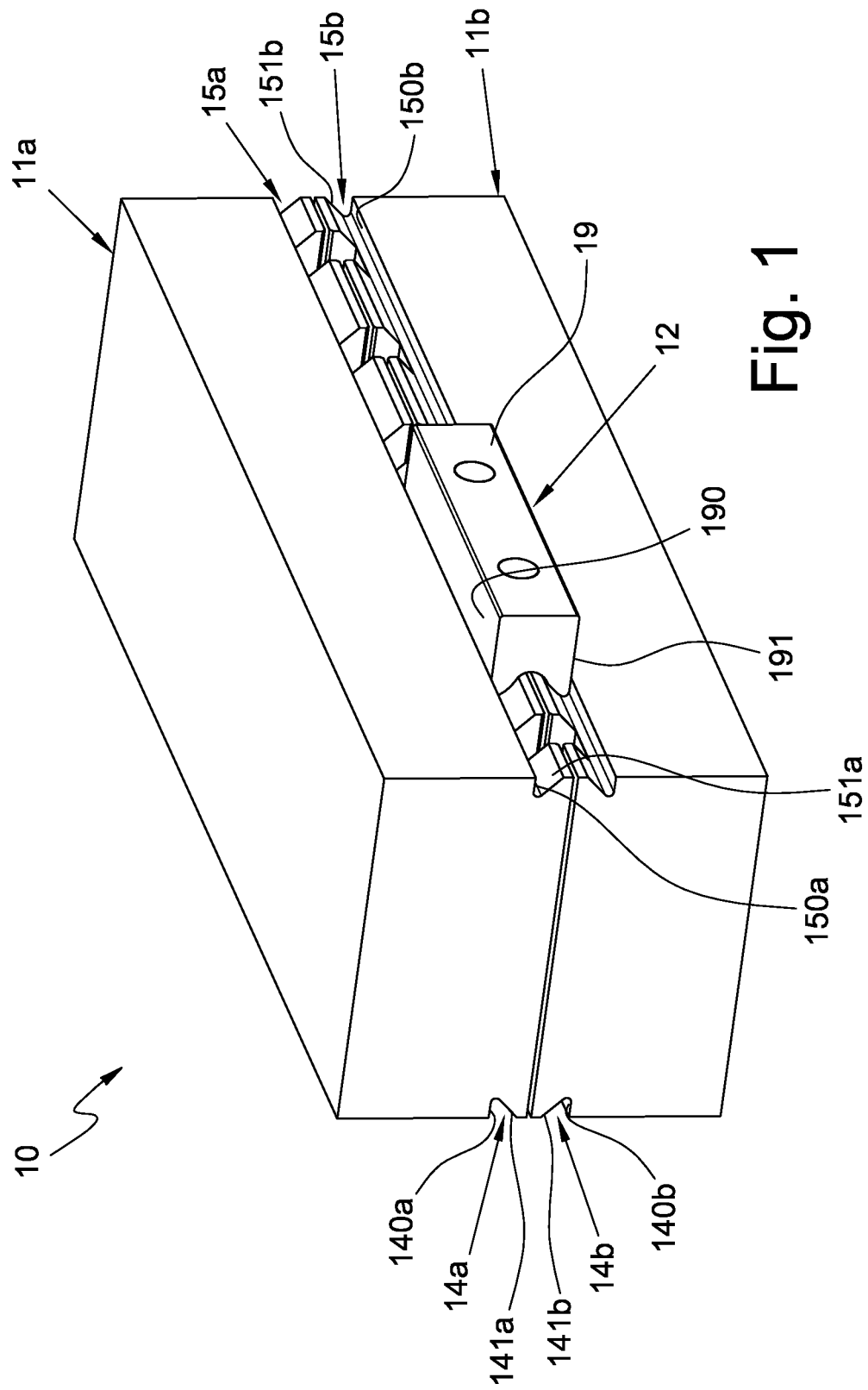
FIG. 1 is an axonometric view of a connection arrangement according to the present invention in the assembled configuration.
Figure 2:
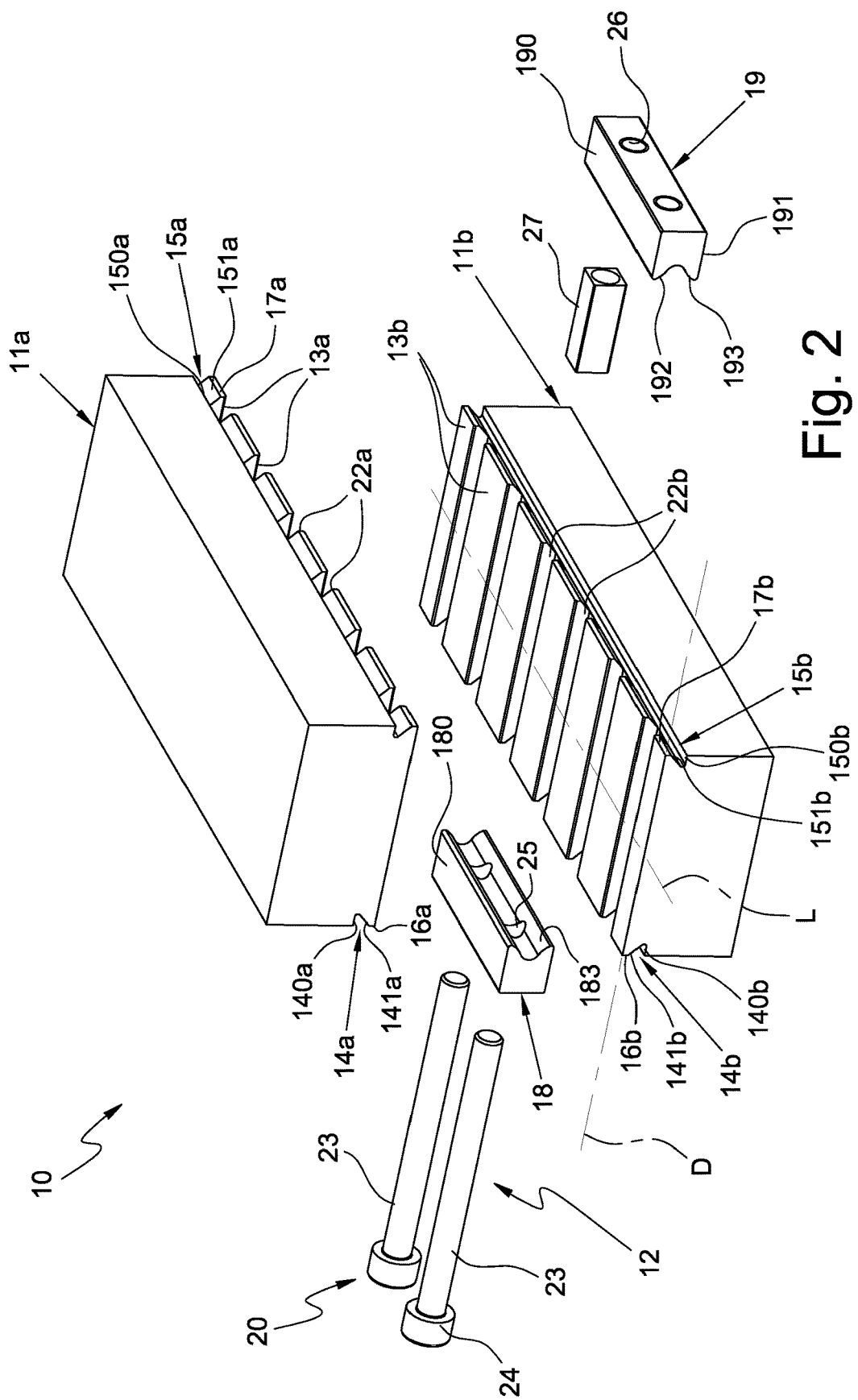
FIG. 2 is an axonometric and exploded view of the connection arrangement of FIG. 1.

It is worth underlining that in the present description we shall use adjectives such as "first" and "second" purely to make the description clearer.

With reference to the attached figures reference numeral 10 wholly indicates a connection arrangement comprising at least two bodies 11a and 11b to be connected to each other and a constraining group 12 for removably constraining such two bodies 11a and 11b to each other.

The two bodies 11a and 11b are the bodies of components of a movement mechanical automation group, in particular of components for transmitting, transforming and driving linear, rotary movements or combinations thereof, except for the components of the power circuit that supplies the mechanical automation group.

The two bodies 11a and 11b, for example, can be the bodies of linear or rotary actuators of the pneumatic, hydraulic or electric type, clamps, slides, profiles, guide profiles and the like.

It is worth underlining that in the attached figures the two bodies 11a and 11b are only schematically shown only with reference to their portion pertaining to the present invention.

Moreover, as far as the features of the present invention are concerned, the two bodies 11a and 11b are modular and unified, therefore corresponding elements are indicated with the same reference numeral respectively indexed with the letters "a" and "b".

Each of two bodies 11a, 11b comprises a face 13a, 13b that, when the two bodies 11a, 11b are in the connection configuration to each other, faces and is substantially parallel to the corresponding face 13a, 13b of the other one of the two bodies 11a, 11b.

As shall become clearer from the rest of the description, the surfaces that define each face 13a, 13b may not be continuous, since they can be interrupted by grooves.

Figure 3A:
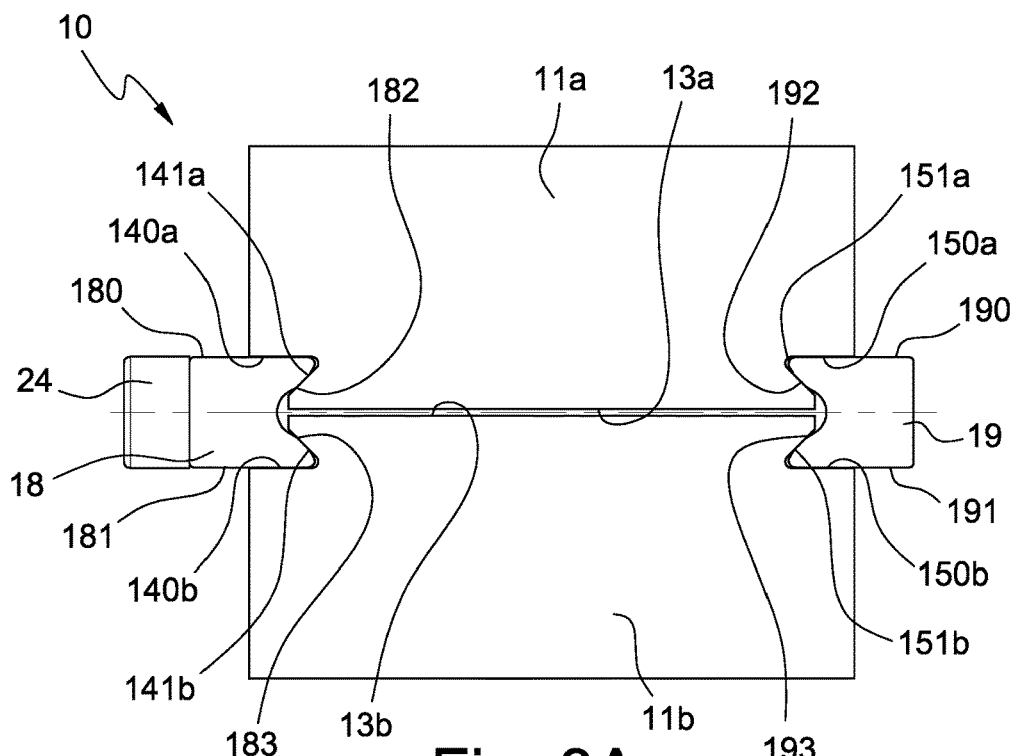
FIG. 3A is a front view of FIG. 1.
Figure 3B:
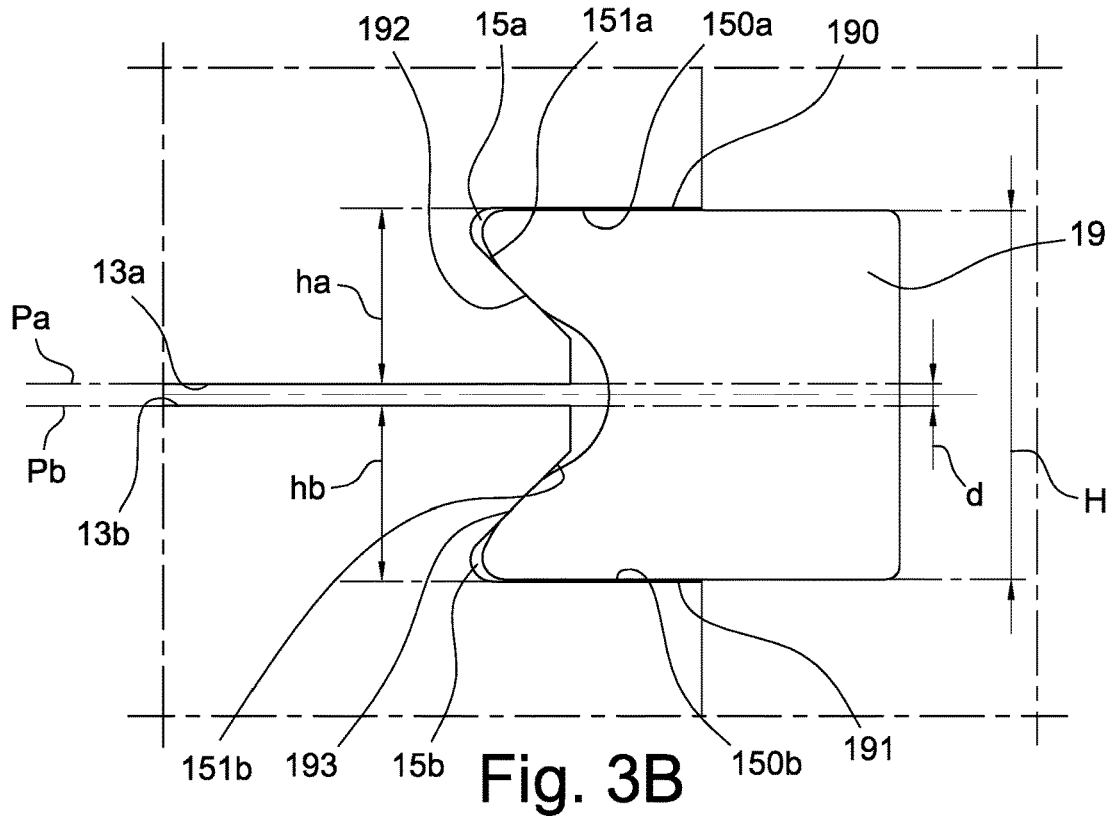
FIG. 3B shows a detail of FIG. 3A in an enlarged scale.
Figure 6:
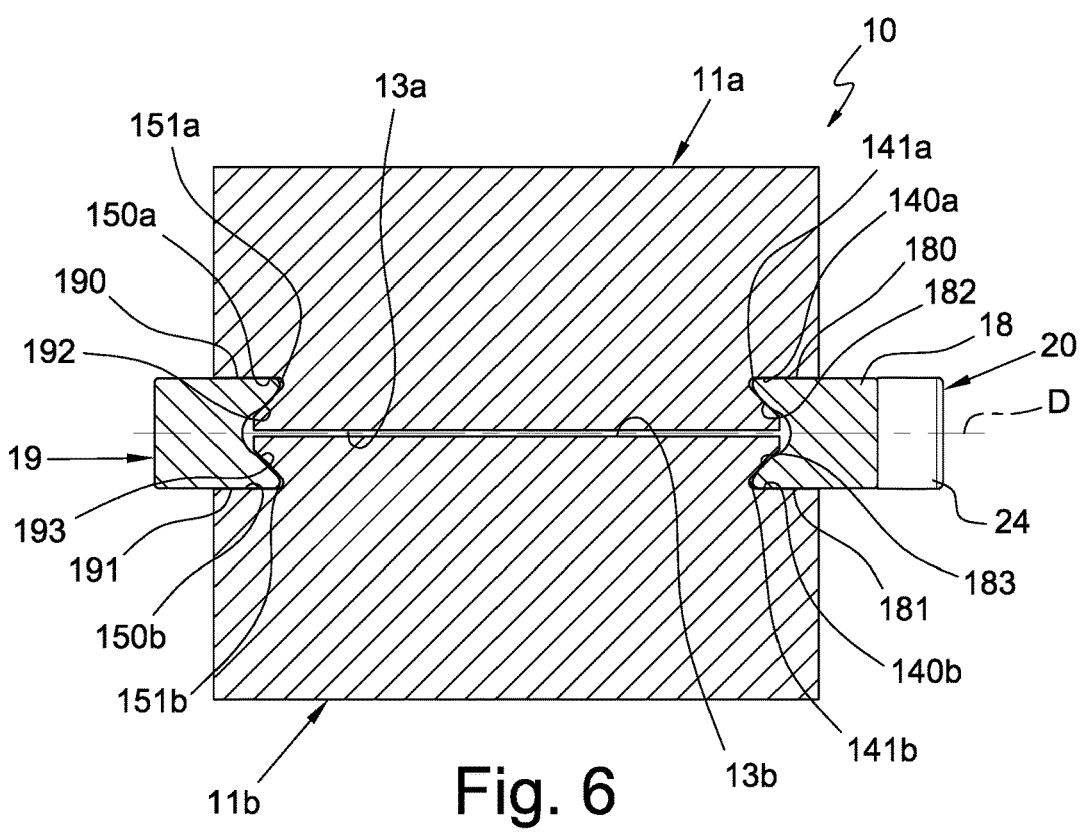
FIG. 6 is a section view according to the plane VI-VI of FIG. 4.
Figure 7:
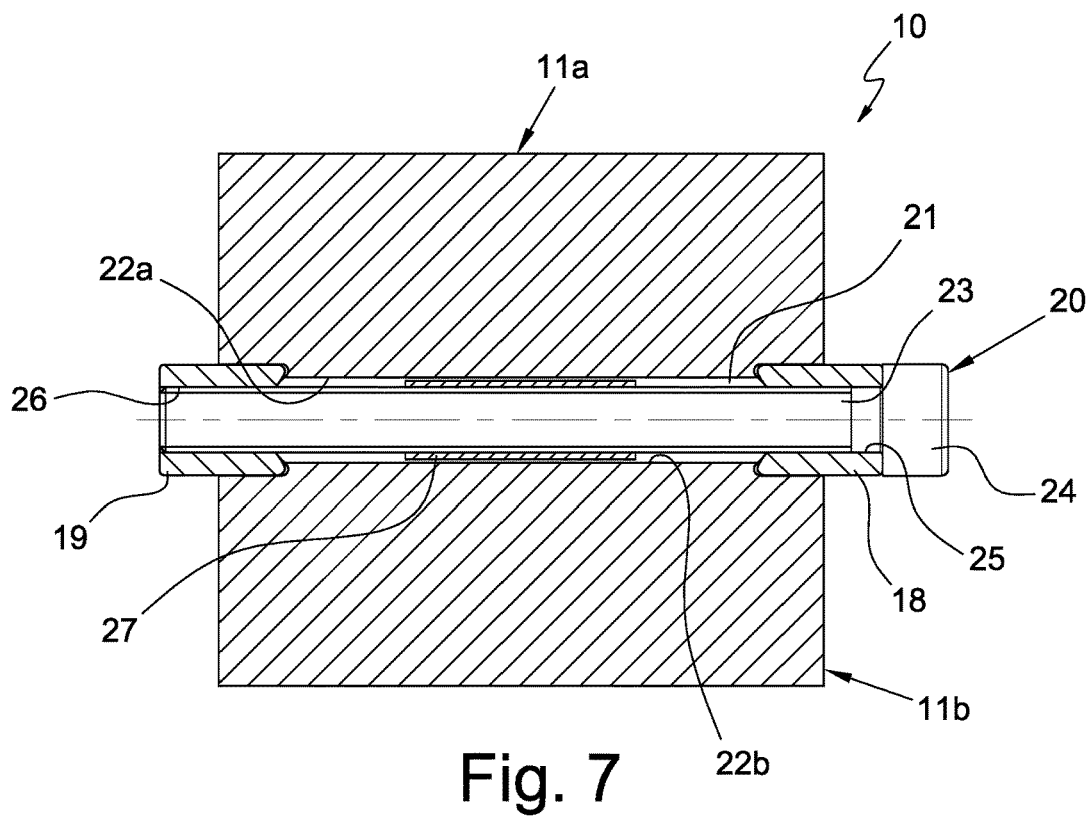
FIG. 7 is a section view according to the plane VII-VII of FIG. 4.
Figure 8:
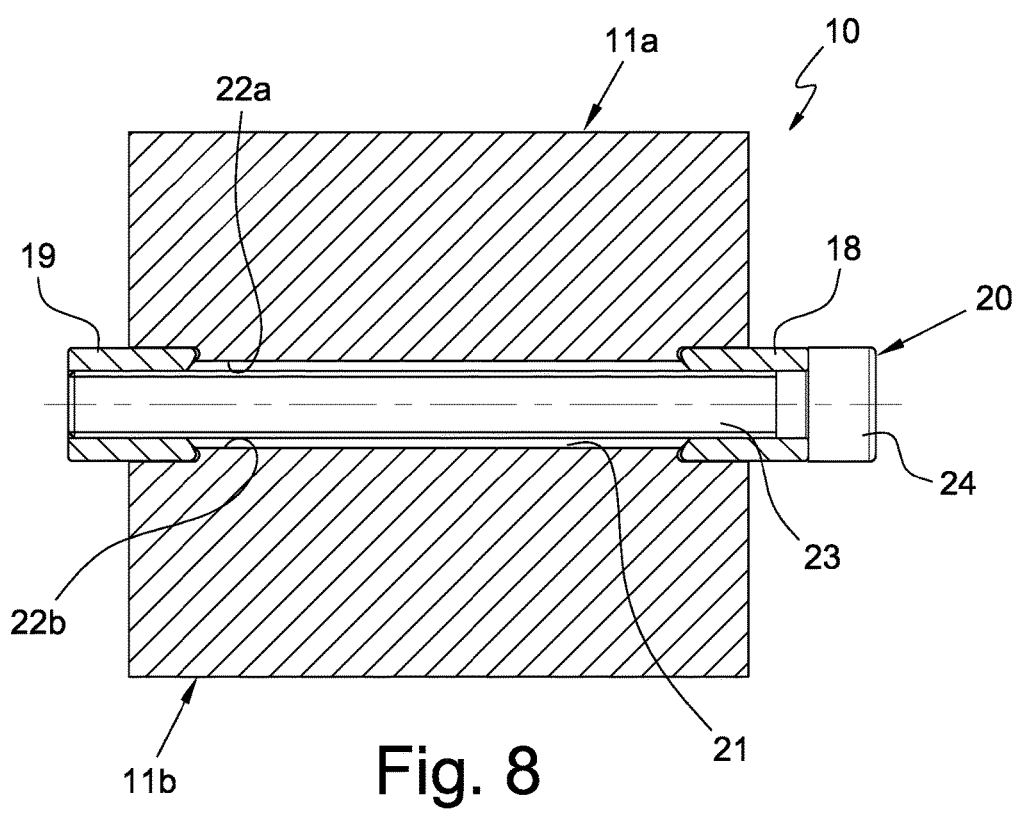
FIG. 8 is a section view according to the plane VIII-VIII of FIG. 4.

Each face 13a, 13b identifies a respective lying plane that is schematically identified by the lines Pa, Pb shown in FIG. 3B.

Each face 13a, 13b develops in length along a longitudinal direction L and in width along a transversal direction D that is substantially perpendicular to the longitudinal direction L and parallel to the lying planes Pa, Pb.

With particular reference to the embodiment represented in the attached figures, each face 13a, 13b is wholly flat and has a right quadrangular shape (that is, except for the grooves that interrupt it).

Each body 11a, 11b is moreover provided with a pair of recesses 14a, 15a and 14b, 15b, respectively, that develop along two opposite sides of the respective body 11a, 11b. In particular, the recesses 14a, 15a and 14b, 15b are obtained in the opposite sides of the respective body 11a, 11b that develop from two opposite perimeter portions of the respective face 13a, 13b, and, in particular, along the two opposite perimeter portions that extend parallel with respect to the longitudinal direction L.

Also in such a case, as shall become clearer in the rest of the description, the recesses 14a, 15a and 14b, 15b can be interrupted by transversal grooves.

Each recess 14a, 15a and 14b, 15b, in section on a plane that is perpendicular with respect to the longitudinal direction L, has a shape that is substantially triangular and has a first flank 140a, 150a and 140b, 150b, respectively, and a second flank 141a, 151a and 141b, 151b that is angled with respect to the corresponding first flank 140a, 150a and 140b, 150b by an acute angle and that is joined to it by a rounded throat. The first flank 140a, 150a and 140b, 150b and the corresponding second flank 141a, 151a and 141b, 151b of each recess 14a, 15a and 14b, 15b are angled with respect to one another by an angle diverging outwards from the respective body 11a, 11b, so as to define a respective dove-tail portion in the corresponding body 11a, 11b.

In the embodiment represented in the attached figures, the first flank 140a, 150a and 140b, 150b of each recess 14a, 15a and 14b, 15b is flat and substantially parallel to the lying plane Pa, Pb of the respective face 13a, 13b.

The second flank 141a, 151a and 141b, 151b of each recess joins the respective face 13a, 13b by means of a respective lateral band 16a, 17a and 16b, 17b.

When the two bodies 11a, 11b are in the connection configuration to one another, each recess 14a, 15a of the body 11a faces—or in any case is arranged above or is aligned along a direction that is orthogonal with respect to the lying plane Pa of the respective face 13a—the corresponding recess 14b, 15b of the other body 11b defining a respective coupling seat with the constraining group 12.

The constraining group 12 comprises at least one pair of locking clamps 18, 19, each of which is at least partially insertable into a respective coupling seat as defined above.

According to one peculiar feature of the present invention, each clamp 18, 19 has:
a pair of first resting surfaces that are respectively indicated with 180, 181 and 190, 191 which, when the two bodies 11a, 11b are in the connection configuration to one another, are in contact with the first flanks of the recesses that define the respective coupling seat, and
a pair of second resting surfaces 182, 183 and 192, 193, respectively, that extend between the corresponding first resting surfaces 180, 181 and 190, 191 and that, when the two bodies 11a, 11b are in the connection configuration to one another, rest on the second flanks of the recesses that define the respective coupling seat, so as to space apart the mutually facing faces 13a, 13b of the two bodies 11a, 11b themselves by a non-null distance d along a direction that is orthogonal to the lying plane Pa, Pb of the faces 13a, 13b themselves so that the latter do not have portions in mutual contact one on the other.

The distance d can also be only in the order of hundredths of a millimeter, for example 0.1 mm or 0.2 mm, which are in any case sufficient to avoid a friction contact between the two faces 13a, 13b.

In the embodiment represented in the attached figures, the first resting surfaces of each clamp 18, and respectively indicated with 180, 181 and 190, 191 are flat, opposite and parallel one another.

The second resting surfaces of each clamp 18 and respectively indicated with 182, 183 and 192, 193 are directly joined to one another in a "V" or "U" manner and extend between the corresponding first resting surfaces 180, 181 and 190, 191.

Advantageously, the second resting surfaces 182, 183 and 192, 193 of each clamp 18, 19 each have at least one convex portion that is intended to come into contact with the respective second flank 141a, 141b and 151a, 151b of the pair of recesses 14a, 14b and 15a, 15b that defines the respective coupling seat. Such convex portions are joined to one another by a concave throat that defines the vertex of the "V" shape or the bottom of the "U" shape.

As an alternative, the second resting surfaces 182, 183 and 192, 193 of each clamp 18, 19 can be flat.

In any case, the second resting surfaces of each clamp 18, 19 and respectively indicated with 182, 183 and 192, 193 each define a resting plane (that in the case represented is tangent with respect to the corresponding convex portion) that is angled with respect to the adjacent first resting surface 180, 181 and 190, 191 by an angling that substantially corresponds to that between the first flank 140a, 140b and 150a, 150b and the second flank 141a, 141b and 151a, 151b of the recesses 14a, 14b and 15a, 15b that define the corresponding coupling seat.

It should be noted that the clamps 18, 19 do not have appendages or in any case portions that are intended to be inserted between the faces 13a, 13b of the two bodies 11a, 11b so as to act as spacer elements of the latter; the clamps 18, 19, that is, do not have portions that are in contact with the faces 13a, 13b.

Moreover, according to the present invention, the two clamps 18, 19 are connected to one another in a removable manner by means of one or more connection members 20, each of which is housed with clearance in a corresponding containment seat 21 that is defined by at least one groove 22a, 22b obtained in at least one of the two bodies 11a, 11b and that passes between the respective two opposite perimeter portions, i.e. between the two opposite sides of the respective body 11a, 11b.

In greater detail, when the two bodies 11a, 11b are in the connection configuration to one another, the recesses 14a, 15a of the body 11a define, with the corresponding recesses 14b, 15b of the body 11b, a respective coupling seat of a respective clamp 18, 19.

The first flanks 140a, 150a of the recesses 14a, 15a of the body 11a are parallel to the first flanks 140b, 150b of the recesses 14b, 15b of the body 11b and to the lying plane Pa, Pb of the respective faces 13a, 13b.

With reference to the attached figures:
the clamp 18 is at least partially inserted inside the coupling seat defined by the recess 14a of the body 11a and by the recess 14b of the body 11b and has the respective first resting surfaces 180, 181 in contact respectively with the first flank 140a of the recess 14a and with the first flank 140b of the recess 14b and the second resting surfaces 182, 183 in contact respectively with the second flank 141a of the recess 14a and with the second flank 141b of the recess 14b;
the clamp 19 is at least partially inserted in the coupling seat defined by the recess 15a of the body 11a and by the recess 15b of the body 11b and has the respective first resting surfaces 190, 191 that are in contact with the first flank 150a of the recess 15a and with the first flank 150b of the recess 15b, respectively, and the second resting surfaces 192, 193 in contact with the second flank 151a of the recess 15a and with the second flank 151b of the recess 15b, respectively.

As can be clearly seen from the attached figures, the distance H between the first resting surfaces 180, 181 and 190, 191 of each clamp 18, 19 is greater than the sum of the maximum distance ha that the face 13a of the body 11a has with respect to the first flanks 140a, 150a of the corresponding recesses 14a, 15a and of the maximum distance hb that the face 13b of the body 11b has with respect to the first flanks 140b, 150b of the corresponding recesses 14b, 15b.

In the embodiment represented in the attached figures the distances ha and hb are the same, therefore the distance H is greater than double ha=hb.

Each body 11a, 11b also comprises one or more grooves 22a, 22b that extend parallel to the transversal dimension D and that are defined open at the respective face 13a, 13b.

The grooves 22a, 22b are spaced apart by a predetermined distance from one another; advantageously, the grooves 22a, 22b follow one another with a constant pitch.

Let us consider the two bodies 11a, 11b in the connection configuration, in which the faces 13a and 13b mutually face one another, one or more grooves 22a, 22b of one of the two bodies 11a, 11b faces a respective groove 22b, 22a of the other body 11b, 11a defining a respective containment seat 21 in which a connection member 20 can be housed.

Each connection member 20 consists of a threaded stem 23 and has a head 24 at one end.

Each of the two locking clamps 18 and 19 has a longitudinal development and has one or more holes for the passage and/or the coupling with a respective threaded stem 23.

In particular, one of the two locking clamps, in the case shown the clamp 18, has one or more through holes 25; the other one of the two locking clamps, in the case shown the clamp 19, has one or more threaded holes 26 in which the opposite end of a respective threaded stem 23 is engaged.

Therefore, by acting upon the threaded stems 23 it is possible to lock or loosen the two clamps 18 and 19.

The constraining group 12 also comprises one or more tongues 27 that can be inserted in a removable manner inside the grooves 22a, 22b of the two bodies 11a, 11b.

In one embodiment, the tongues 27 are passed through by an axial through hole 28 for the passage inside it of the threaded stem 23.

In such a case, therefore, the tongues 27 can be inserted in the same containment seats 21 as the ones of the threaded stems 23.

It is also possible for the tongues 27' to consist of full solids, in such a case they are housed in grooves 22a, 22b that are different from those that define the containment seats 21 of the threaded stems 19.

The tongues 27, 27' act both as reference elements of the position of the two bodies 11a, 11b relatively to one another along the longitudinal direction L, and as a further constraining element that is suitable for preventing a sliding of the two bodies 11a, 11b relatively to one another along such a same direction.

The operation of the present invention and in particular the steps of assembling and disassembling the connection arrangement 10 can be immediately understood by a person skilled in the art in the light of the description above and by the attached figures.

Upon possible arrangement of one or more tongues 27 and/or 27' in corresponding one or more grooves 22a, 22b, the two bodies 11a, 11b are brought closed to one another with the mutually facing faces 13a, 13b even if they are misaligned along the transversal direction D by a misalignment DT.

The two locking clamps 18 and 19 are at least partially inserted in the respective coupling seat defined by the recesses 14a, 14b and 15a, 15b which are at least partially facing one another, one over the other or in any case aligned, the two clamps being joined through one or more threaded stems 23.

The threaded stems 23 are housed in the containment seats 21 and/or in the axial hole 28 of the possible tongue 27.

Both the containment seats 21 and the through holes of the tongues 27 are sized so that the threaded stems 23 are housed with clearance inside them, i.e. without there being direct contact between such elements.

Figure 10A:
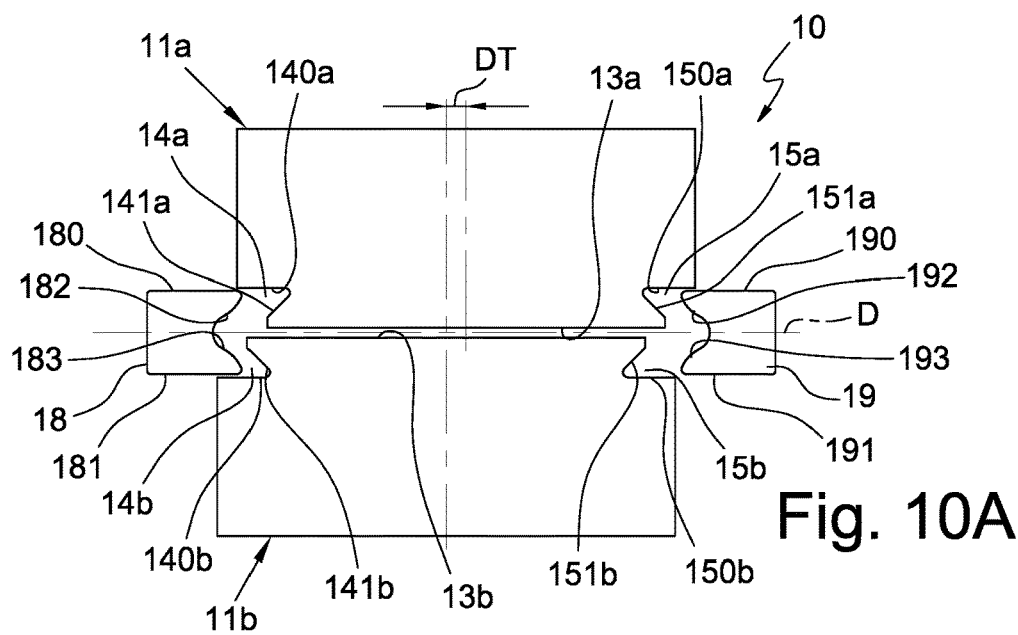
FIGS. 10A, 10B and 10C show a schematic view of a sequence of connection steps of two bodies in the connection arrangement according to the present invention.
Figure 10B:
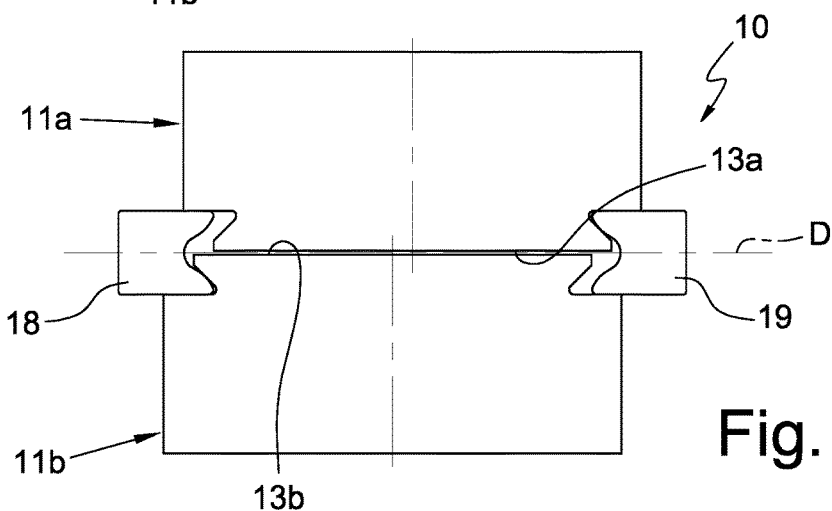
Figure 10C:
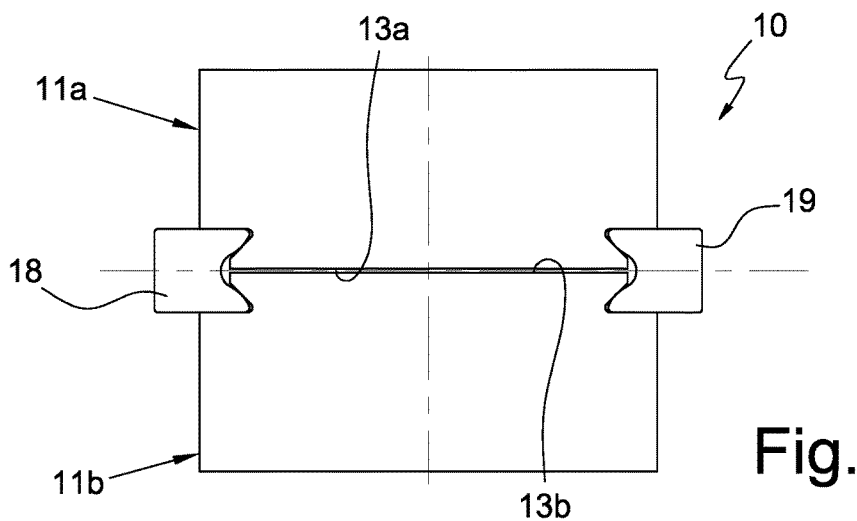
Figure 11A:
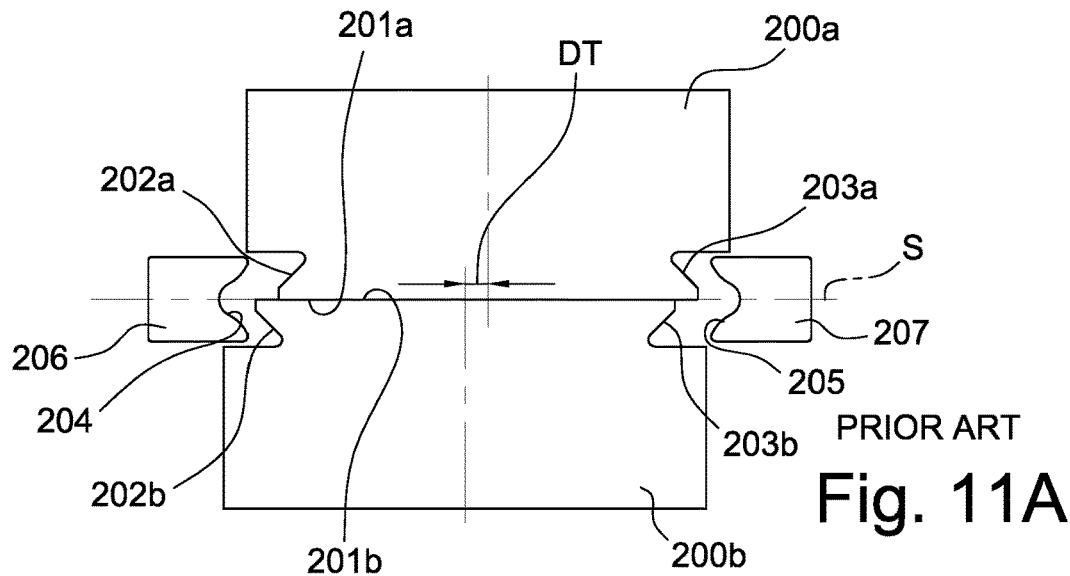
FIGS. 11A, 11B and 11C schematically show a sequence of connection steps of two bodies in the connection arrangement according to the prior art.
Figure 11B:
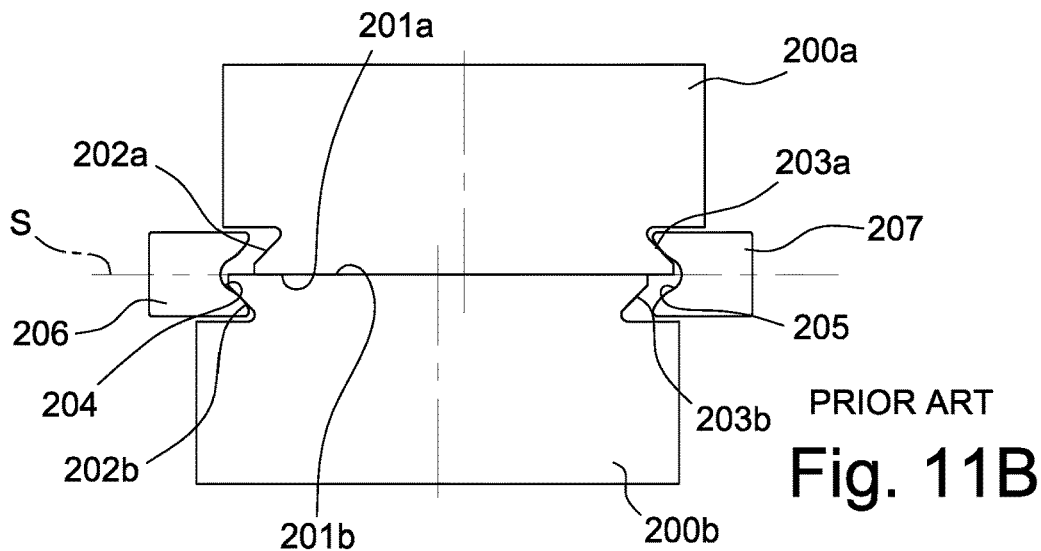
Figure 11C:
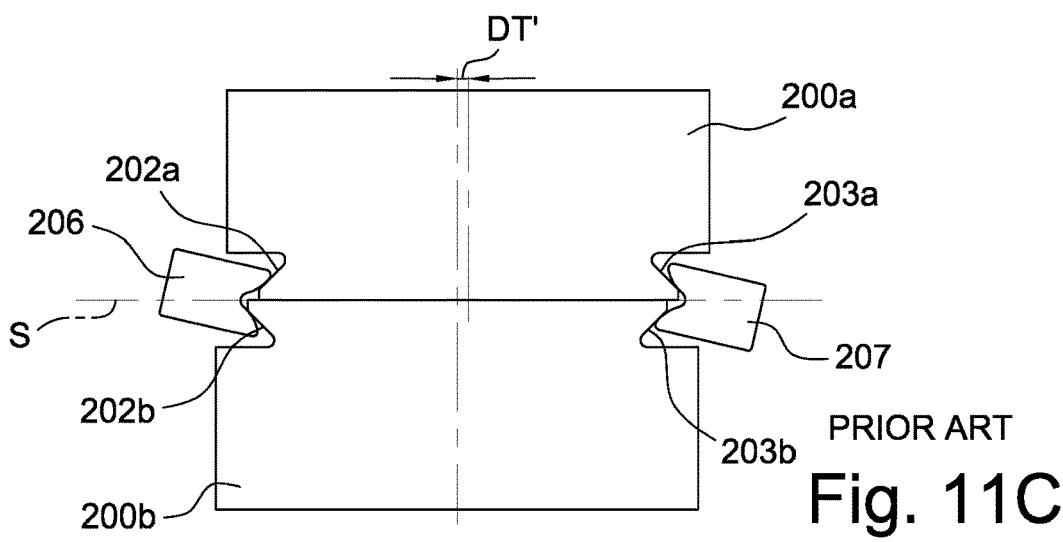

FIGS. 10A to 10C schematically show the locking steps of the clamps 18, 19 by the threaded stems 23, where the latter are only schematically represented by the line of the respective longitudinal axis.

It should be noted that in the connection arrangement 10 according to the present invention, the pairs of first flanks 140a, 140b and 150a, 150b that define each coupling seat of a respective clamp 18, 19 cooperate with the first resting surfaces 180, 181 and 190, 191 of the respective clamp 18, 19 so as to act as a guide for the movement of the two clamps 18, 19 relatively to one another along the direction of mutual approach/alignment—direction that is parallel to the axes of the connection members 20 and to the transversal direction D—so as to prevent the clamps 18, 19 from rotating on transversal planes (i.e. orthogonal with respect to the longitudinal direction L), as schematically shown in FIGS. 10A and 10B.

This ensures that the clamps 18, 19 are kept aligned during the locking steps (FIG. 10B) and until the completion thereof (FIG. 10C). In such a way, the clamps 18, 19 exert, by means of their respective second resting surfaces 182, 183 and 192, 193, a thrust on the bodies 11a, 11b in a direction that is parallel with respect to the transversal direction D recovering, that is nullifying, a possible transversal misalignment DT that is initially present between them practically in a complete manner except for a negligible amount that can be estimated at around 0.1 mm.

In the connection configuration (FIG. 10C), therefore, the two bodies 11a, 11b are perfectly centred along the transversal direction D.

In the connection arrangement 10 according to the present invention the mutual resting surfaces between the constraining group 12 and the two bodies 11a, 11b are:
- the first resting surfaces 180, 181 and 190, 191 of the clamps 18, 19 which surfaces are in contact with the first flanks 140a, 140b and 150a, 150b of the recesses 14a, 14b and 15a, 15b that define the respective coupling seat, and
- the second resting surfaces 182, 183 and 192, 193 of the clamps 18, 19 which surfaces are in contact with the second flanks 141a, 141b and 151a, 151b of the recesses 14a, 14b and 15a, 15b that define the respective coupling seat.

It should be noted that in the connection arrangement 10 according to the present invention, the faces 13a, 13b of the two bodies 11a, 11b are not in contact with one another, but are spaced apart from one another by a distance d. In the embodiment represented in the attached figures, such a distance d is in any case limited and is less than the dimension of the connection members 20 along the direction that is orthogonal with respect to the faces 13a, 13b themselves (in the specific case it is less than the diameter of the threaded stems), being such connection members housed in the respective containment seats 21 and, therefore, recessed inside the bodies 11a, 11b themselves.

It should also be noted that, in the assembling and connection configuration, the two bodies 11a and 11b, although spaced apart from one another, are spaced apart to a lesser extent with respect to solutions in which a spacer is inserted between them (as for example described in U.S. Pat. No. 5,123,770). This arrangement allows, therefore, to reduce the bulk of the connection arrangement 10 considered as a whole.

The possible presence of the tongues 27, 27' allows to create references of the two bodies 11a, 11b relatively to one another that can therefore be disassembled and reassembled in the same spatial arrangement, in a simple and rapid manner.

The possible tongues 27, 27', moreover, act as further constraining and strengthening members for connecting the two bodies 11a, 11b that are suitable, in particular, for preventing the two bodies 11a, 11b from sliding and shifting along the direction L due to overloading and/or vibrations.

The connection arrangement object of the present invention has the advantage of allowing a perfect alignment and centring of the two bodies to be connected both in the longitudinal direction and in the transversal direction, allowing the locking clamps to be kept aligned and centred with respect to the transversal direction of the two bodies.

The connection arrangement object of the present invention also has the advantage of being particularly compact and of having reduced bulks and allows to obtain a greater connection rigidity.

It, also, allows to determine and reproduce the position of the two bodies relatively to one another, bodies that are connected to one another, so as to be able to easily and precisely carry out subsequent disassembly and reassembly of the two bodies themselves.

The connection arrangement thus conceived can undergo numerous modifications and variants, all covered by the invention; moreover, all the details can be replaced by technically equivalent elements.

For example, the first flank and the second flank of each recess could be both inclined with respect to the lying plane of the face of the corresponding body or, considering each body in a transversal section, with respect to the transversal direction D; in particular, the first flank of each recess could not be exactly parallel to the lying plane of the face of the corresponding body. In such a case, therefore, the first resting surfaces and the second resting surfaces of each locking clamp or, in any case, the resting planes respectively defined by them, would be angled with respect to one another in a corresponding manner.

Otherwise, the connection member of the two locking clamps could be connected to them by means of nuts; the shape and, in particular, the transversal section of the grooves, of the seats defined by them and of the tongues could be different from what is represented in the attached figures.

In practice the materials used, as well as the dimensions, can be any according to the technical requirements.

The invention claimed is:

1. Connection arrangement comprising at least two bodies of components of a movement mechanical automation group for transmitting, transforming or driving linear or rotary movements, to be connected to each other, and a constraining group for constraining said at least two bodies to each other in a removable manner, wherein each of said-two bodies comprises:
   a face that, when said two bodies are in a connection configuration to each other, faces the corresponding face of the other one of said two bodies and that has two opposite perimeter portions,
   two sides that extend from said opposite perimeter portions, and
   a pair of recesses each of which is defined along a respective said side and has a first flank and a second flank that are angled to each other and diverge outwards, wherein, when said two bodies are in the connection configuration with each other, each recess of one of said two bodies defines, with a corresponding recess of the other one of said two bodies, a respective coupling seat with said constraining group, and
   said constraining group comprises:
   at least one pair of locking clamps, each of which is at least partially insertable into a respective said coupling seat and has a pair of first resting surfaces that, when said two bodies are in the connection configuration with each other, are in contact with said first flanks of the recesses defining said respective coupling seat, and a pair of second resting surfaces that, when said two bodies are in the connection configuration to each other, are in contact with said second flanks of said recesses defining the respective said coupling seat, spacing from each other said mutually facing faces of said two bodies by a non-null distance along a direction orthogonal to a lying plane (Pa, Pb) defined by each of said faces so that said faces do not have portions in mutual contact with each other, and at least one connection member for the removable connection of said locking clamps to each other, wherein each of the at least one pair of locking clamps has at least one hole in each locking clamp to which the at least one connection member is engaged, wherein said connection member is housed with clearance in a corresponding containing seat defined by at least one groove obtained in at least one of said two bodies and that passes between the respective said two opposite perimeter portions, such that when the connection member is housed within the groove, it extends from one opposite perimeter portion to the other, and connects the pair of locking clamps to each other, and wherein each of said two bodies comprises at least one said groove, wherein said at least one groove is open at said face of the corresponding body, and wherein, when said two bodies are in the connection configuration to each other, said at least one groove of one of said two bodies faces the at least one groove of the other one of said two bodies so as to define said containment seat and receive the at least one connection member therein.

2. Connection arrangement according to claim 1, wherein said second resting surfaces of each of said locking clamps each define a resting plane that is angled with respect to the resting plane defined by the respective said first resting surfaces of said locking clamp, with an angling substantially corresponding to that between said first flank and said second flank of the corresponding said recesses defining said respective coupling seat.

3. Connection arrangement according to claim 1, wherein said first flank of each of said recesses is flat and substantially parallel to the lying plane (Pa, Pb) of said face of the corresponding said body and in that said first resting surfaces of each of said clamps are flat, opposite and parallel to each other, wherein, when said bodies are in the connection configuration, the lying planes (Pa, Pb) of said faces are substantially parallel to each other.

4. Connection arrangement according to claim 1, wherein said second flank of each of said recesses forms an acute angle with the corresponding said first flank.

5. Connection arrangement according to claim 1, wherein said second resting surfaces of each of said locking clamps are U or V joined to each other and extend between said corresponding first resting surfaces.

6. Connection arrangement according to claim 1, wherein the maximum distance between said first resting surfaces of each of said locking clamps is greater than the sum of the maximum distance that said face of each of said two bodies has with respect to the respective first flanks of the corresponding said recesses.

7. Connection arrangement according to claim 1, wherein each of said two bodies comprises a plurality of said grooves arranged parallel to each other and at a defined distance from each other, wherein, when said two bodies are in the connection configuration to each other, at least a part of the grooves of one of said two bodies faces at least one corresponding part of the grooves of the other one of said two bodies so as to define a plurality of said containment seats.

8. Connection arrangement according to claim 1, wherein said constraining group also comprises at least one tongue removably insertable into said at least one groove of each of said at least two bodies.

9. Connection arrangement according to claim 8, wherein said at least one tongue comprises an axial through hole for the passage in it of said at least one connection member.

10. Connection arrangement according to claim 1, wherein said at least one connection member consists of a threaded stem the opposite ends of which are associated with the clamps of said at least one pair of clamps.

* * * * *